(12) United States Patent
Kim

(10) Patent No.: US 12,485,930 B2
(45) Date of Patent: Dec. 2, 2025

(54) DEVICE AND METHOD FOR CONTROLLING A VEHICLE SEAT

(71) Applicants: HYUNDAI MOTOR COMPANY, Seoul (KR); KIA Corporation, Seoul (KR)

(72) Inventor: Dae Young Kim, Gwangmyeong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 304 days.

(21) Appl. No.: 17/379,267

(22) Filed: Jul. 19, 2021

(65) Prior Publication Data

US 2022/0169288 A1 Jun. 2, 2022

(30) Foreign Application Priority Data

Nov. 27, 2020 (KR) .................. 10-2020-0163223

(51) Int. Cl.
  *B60W 60/00* (2020.01)
  *B60N 2/02* (2006.01)
(52) U.S. Cl.
  CPC ....... *B60W 60/0053* (2020.02); *B60N 2/0248* (2013.01); *B60N 2/0268* (2023.08); *B60N 2210/24* (2023.08)
(58) Field of Classification Search
  CPC ......... B60W 60/0053; B60W 2420/42; B60W 2540/223; B60W 2556/10; B60W 60/0059; B60W 10/20; B60W 40/08; B60W 2040/0881; B60W 2540/10; B60W 2540/12; B60N 2/0248; B60N 2002/0268;
  (Continued)

(56) References Cited

U.S. PATENT DOCUMENTS 9,738,179 B2   8/2017  Ebina et al.
10,864,867 B2  12/2020 Takamatsu et al.
(Continued)

FOREIGN PATENT DOCUMENTS

CN   105579321 A    5/2016
CN   107415959 A   12/2017
(Continued)

OTHER PUBLICATIONS

European Search Report issued in related U.S. Appl. No. 21/183,654, mailed Dec. 20, 2021 (10 pages).

(Continued)

*Primary Examiner* — Luke Huynh
(74) *Attorney, Agent, or Firm* — Lempia Summerfield Katz LLC

(57) ABSTRACT

A device for controlling travel of a vehicle includes: a storage that stores at least one of a first seat location before an autonomous driving, a second seat location set by a driver, or a third seat location in a current state; and a controller that controls a seat of the vehicle based on the seat location stored in the storage when a driving state of the vehicle is switched from an autonomous driving state to a manual driving state by transferring a control right of the vehicle to the driver. The device may allow the driver to immediately receive the control right when the control right of the vehicle is transferred to the driver, so that the transfer of the control right may be performed safely.

19 Claims, 13 Drawing Sheets

(58) Field of Classification Search
CPC ............ B60N 2002/0272; B62D 1/183; G05D 1/0061; G05D 2201/0213
See application file for complete search history.

(56) References Cited

U.S. PATENT DOCUMENTS

| | | | |
|---|---|---|---|
| 2016/0159251 A1 | 6/2016 | Ebina et al. | |
| 2017/0217335 A1* | 8/2017 | Tominaga | B60N 2/0228 |
| 2017/0334451 A1 | 11/2017 | Asakura et al. | |
| 2018/0029501 A1* | 2/2018 | Wolf | B60R 21/01512 |
| 2018/0244174 A1 | 8/2018 | Tan | |
| 2018/0244175 A1* | 8/2018 | Tan | B60K 35/00 |
| 2018/0304771 A1* | 10/2018 | Wolf | B60N 2/002 |
| 2020/0262321 A1* | 8/2020 | Masu | B60N 3/063 |
| 2021/0016731 A1* | 1/2021 | Onyekwelu | B60R 16/037 |
| 2021/0039678 A1* | 2/2021 | Shojima | B60W 60/0059 |
| 2021/0124349 A1* | 4/2021 | Koehler | B62D 1/185 |
| 2021/0206393 A1* | 7/2021 | Yang | B60N 2/0272 |
| 2023/0026720 A1* | 1/2023 | Decker | B60W 60/0051 |
| 2023/0068393 A1* | 3/2023 | Hannig | B60N 2/22 |

FOREIGN PATENT DOCUMENTS

| | | |
|---|---|---|
| CN | 108725266 A | 11/2018 |
| DE | 102018005421 A1 | 1/2020 |
| EP | 3025921 A1 | 6/2016 |
| EP | 3521107 A1 | 8/2019 |

OTHER PUBLICATIONS

Office Action cited in Chinese application No. 202110879894.6; Jun. 18, 2025; 13 pp.

Office Action cited in Korean application No. 10-2020-0163223; Ocotber 15, 2025; 10 pp.

* cited by examiner

DEVICE AND METHOD FOR CONTROLLING A VEHICLE SEAT

CROSS-REFERENCE TO RELATED APPLICATION

This application claims priority to and the benefit of Korean Patent Application No. 10-2020-0163223, filed on Nov. 27, 2020, the entire contents of which are incorporated herein by reference.

FIELD

The present disclosure relates to a device and a method for controlling travel of a vehicle.

BACKGROUND

The statements in this section merely provide background information related to the present disclosure and may not constitute prior art.

Autonomous driving is classified into steps from an autonomous driving step 0 to an autonomous driving step 5 based on a control performance of a system. Among those, in an autonomous driving step 3, travel control right may be transferred from a driver to the system, or from the system to the driver. When the travel control right is transferred from the system to the driver, the system may perform guide by outputting a warning.

However, when the system attempts to transfer the travel control right to the driver, and the driver is not able to rapidly receive the travel control right, it is difficult to respond immediately, which leads to an accident. Especially, when the driver is in a state in which normal manual travel is difficult in an autonomous driving state, the driver is in a situation in which it is difficult to receive the travel control right, so that it is difficult to respond rapidly. Therefore, it is a reality that development of a technology that enables the driver to rapidly and safely receive the travel control right when the system attempts to transfer the travel control right to the driver is desired.

SUMMARY

The present disclosure has been made to solve the above-mentioned problems occurring in the prior art while advantages achieved by the prior art are maintained intact.

An aspect of the present disclosure provides a device and a method for controlling travel of a vehicle that may allow a driver to immediately receive a travel control right when the travel control right is transferred from a system to the driver.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling travel of a vehicle includes a storage that stores at least one of a first seat location before autonomous driving, a second seat location set by a driver, and/or a third seat location in a current state, and a controller that controls a seat based on a seat location stored in the storage when a driving state of the vehicle is switched from an autonomous driving state to a manual driving state by transferring a control right (e.g., driving control right) of the vehicle to the driver.

In one form, the controller may set the seat location to the first seat location when the first seat location is stored in the storage, and the control right is transferred to the driver.

In one form, the controller may set the seat location to the second seat location when the second seat location is stored in the storage, and the control right is transferred to the driver.

In one form, the controller may determine whether the third seat location of the current state is unsuitable for manual driving when the control right is transferred to the driver, and set the seat location based on the determination result.

In one form, the controller may determine that the third seat location is unsuitable for the manual driving when one of a first condition where a degree of spacing of the third seat location from a preset seat location exceeds a first reference value, a second condition where a degree of spacing of the third seat location from the first seat location exceeds a second reference value, a third condition where a degree of spacing of a location of a face of the driver from a normal location exceeds a third reference value, and a fourth condition where a degree of spacing of the third seat location from the second seat location exceeds a fourth reference value is satisfied.

In one form, the normal location may include a location where the driver is able to manipulate a brake pedal or an accelerator pedal.

In one form, the controller may set the seat location to the first seat location when the first seat location is stored in the storage and it is determined that the third seat location is unsuitable for the manual driving.

In one form, the controller may set the seat location to the second seat location when the second seat location is stored in the storage and it is determined that the third seat location is unsuitable for the manual driving.

In one form, the controller may maintain the seat location at the third seat location when it is determined that the third seat location is suitable for the manual driving.

In one form, at least one of a first steering wheel location before the autonomous driving and/or a second steering wheel location in the current state may be further stored in the storage.

In one form, the controller may control a steering wheel based on a steering wheel location stored in the storage when the control right is transferred to the driver.

According to another aspect of the present disclosure, a method for controlling travel of a vehicle includes: storing, by a storage, at least one of a first seat location before autonomous driving, a second seat location set by a driver, and/or a third seat location in a current state; switching, by a controller, from the autonomous driving to a manual driving of the vehicle by transferring a control right of the vehicle to the driver; and controlling, by the controller, a seat of the vehicle based on a seat location stored in the storage in a manual driving state of the vehicle.

In one form, the method may further include setting the seat location to the first seat location when the first seat location is stored in the storage, and the control right is transferred to the driver.

In one form, the method may further include setting the seat location to the second seat location when the second seat location is stored in the storage, and the control right is transferred to the driver.

In one form, the method may further include determining whether the third seat location of the current state is unsuitable for manual driving when the control right is transferred to the driver, and setting the seat location based on the determination result.

In one form, the method may further include determining that the third seat location is unsuitable for the manual driving when one of a first condition where a degree of spacing of the third seat location from a preset seat location exceeds a first reference value, a second condition where a degree of spacing of the third seat location from the first seat location exceeds a second reference value, a third condition where a degree of spacing of a location of a face of the driver from a normal location exceeds a third reference value, and a fourth condition where a degree of spacing of the third seat location from the second seat location exceeds a fourth reference value is satisfied.

In one form, the normal location may include a location where the driver is able to manipulate a brake pedal or an accelerator pedal.

In one form, the method may further include further storing at least one of a first steering wheel location before the autonomous driving and/or a second steering wheel location in the current state in the storage.

In one form, the method may further include controlling a steering wheel based on a steering wheel location stored in the storage when the control right is transferred to the driver.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
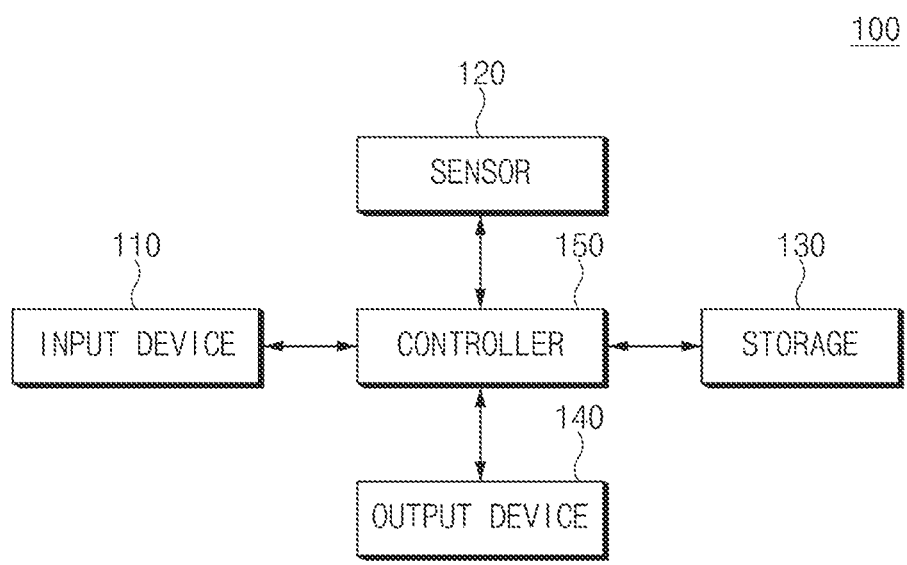
FIG. 1 is a view illustrating a configuration of a travel control device of a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the forms of the present disclosure, a detailed description of the related known configuration or function will be omitted when it is determined that it interferes with the understanding of the exemplary forms of the present disclosure.

In describing the components of the exemplary forms according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view illustrating a configuration of a travel control device of a vehicle according to an exemplary form of the present disclosure.

As shown in FIG. 1, a travel control device 100 of a vehicle may include an input device 110, a sensor 120, storage 130, an output device 140, and a controller 150.

The input device 110 may receive an input signal corresponding to a manipulation, an operation, or a voice of a driver. The controller 150 may set a seat location or a steering wheel location corresponding to the input signal. According to one form, the controller 150 may control a frontward or backward adjustment, an upward or downward adjustment, and a backrest angle of a seat corresponding to the input signal. The input device 110 may be implemented as a scroll wheel, a button, a knob, a touch screen, a touch pad, a lever, a track ball, and the like that may be manipulated by a passenger, or as at least one of an operation sensor and/or a voice recognition sensor that senses an operation or a voice of the passenger or a combination thereof.

The sensor 120 may include a seat sensor, a steering sensor, and an image sensor. The seat sensor may sense a location resulted from the frontward adjustment or the backward adjustment of the seat, a vertical level resulted from the upward or downward adjustment of the seat, and a tilted angle of the backrest of the seat. The steering sensor may sense a tilted angle of a steering wheel (a vertical level of the steering wheel), and a location of a telescope (a location of the steering wheel moved upward, downward, frontward, or backward). In addition, the image sensor may sense a state of the driver. According to another form, the image sensor may sense a location of a face of the driver, and the controller 150 may calculate a distance between the face and the image sensor based on the location of the face.

The storage 130 may store at least one of a first seat location before autonomous driving was activated, a first steering wheel location before the autonomous driving was activated, a second seat location set by the driver, a third seat location in a current state, and/or a second steering wheel location in the current state. In addition, the storage 130 may store at least one algorithm that performs an operation or an execution of various commands for an operation of the travel control device of the vehicle according to an exemplary form of the present disclosure. The storage 130 may include at least one storage medium of a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and an optical disk.

The output device 140 may output seat setting information or steering wheel setting information of the controller 150. According to an exemplary form, the output device 140 may be implemented as a display device or a sound output device. In this connection, the display device may include an AVN display device, a HUD, a cluster, and the like.

The controller 150 may be implemented by various processing devices such as a microprocessor or the like with an embedded semiconductor chip or the like capable of performing the operation or the execution of the various commands, and may control an overall operation of the travel control device of the vehicle based on at least one algorithm stored in the storage 130. According to an exemplary form, the controller 150 may set a seat location or a steering wheel location when transferring a travel control right to the driver in the state in which the autonomous driving is activated.

In another form, the controller 150 may set the seat location to the first seat location when the first seat location is stored in the storage 130, and the travel control right is transferred to the driver in the autonomous driving state. In this connection, the first seat location may include a seat location in a last manual driving state before the autonomous driving is activated. In addition, the controller 150 may output the fact that the seat location is set to the first seat location through the output device 140. In addition, when the steering wheel is in a hand on state, a location of a driver's seat is stored in the steering wheel hand on state, and the travel control right is transferred to the driver in the autonomous driving state, the controller 150 may set the seat location to the first seat location.

According to another form, when the second seat location set by the driver is stored in the storage 130, and the travel control right is transferred to the driver in the autonomous driving state, the controller 150 may set the seat location to the second seat location.

In addition, when the travel control right is transferred in the autonomous driving state, the controller 150 may determine whether the third seat location in the current state is unsuitable for the manual driving, and set the seat location based on the determination result. In one form, when one of a first condition in which a degree at which the third seat location is spaced apart from a preset location exceeds a first reference value, a second condition in which a degree at which the third seat location is spaced apart from the first seat location exceeds a second reference value, a third condition in which a degree at which the location of the face of the driver is spaced apart from a normal location exceeds a third reference value, and a fourth condition in which a degree at which the third seat location is spaced apart from the second seat location exceeds a fourth reference value is satisfied, the controller 150 may determine that the third seat location is unsuitable for the manual driving. In this connection, the normal location may include a location at which the driver is able to manipulate a brake pedal or an accelerator pedal while gripping the steering wheel.

According to another form, when the first seat location is stored in the storage 130 and it is determined that the third seat location is unsuitable for the manual driving, the controller 150 may set the seat location to the first seat location. In addition, when the steering wheel is in the hand on state, the location of the driver's seat is stored in the steering wheel hand on state, and it is determined in the autonomous driving state that the third seat location is unsuitable for the manual driving, the controller 150 may set the seat location to the first seat location.

According to another form, when the second seat location is stored in the storage 130 and it is determined that the third seat location is unsuitable for the manual driving, the controller 150 may set the seat location to the second seat location.

In addition, when it is determined that the third seat location is suitable, the controller 150 may maintain the seat location at the third seat location.

When the first steering wheel location before the autonomous driving was activated is stored in the storage 130, and the travel control right is transferred to the driver in the autonomous driving state, the controller 150 may determine whether the second steering wheel location of the current state is unsuitable for the manual driving, and set the steering wheel location based on the determination result. According to one form, when one of a fifth condition in which a degree at which the second steering wheel location is spaced apart from the first steering wheel location exceeds a fifth reference value and a sixth condition in which a distance between the seat and the second steering wheel location exceeds a sixth reference value is satisfied, the controller 150 may determine that the second steering wheel location is unsuitable for the manual driving.

According to another form, when it is determined that the second steering wheel location is unsuitable for the manual driving, the controller 150 may set the steering wheel location to the first steering wheel location. On the other hand, when it is determined that the second steering wheel location is suitable for the manual driving, the controller 150 may maintain the steering wheel location at the second steering wheel location.

In addition, when the steering wheel location is set, the controller 150 may output the setting information through the output device 140.

FIGS. 2 to 12 are flowcharts illustrating a travel control method of a vehicle according to some forms of the present disclosure.

Figure 2:
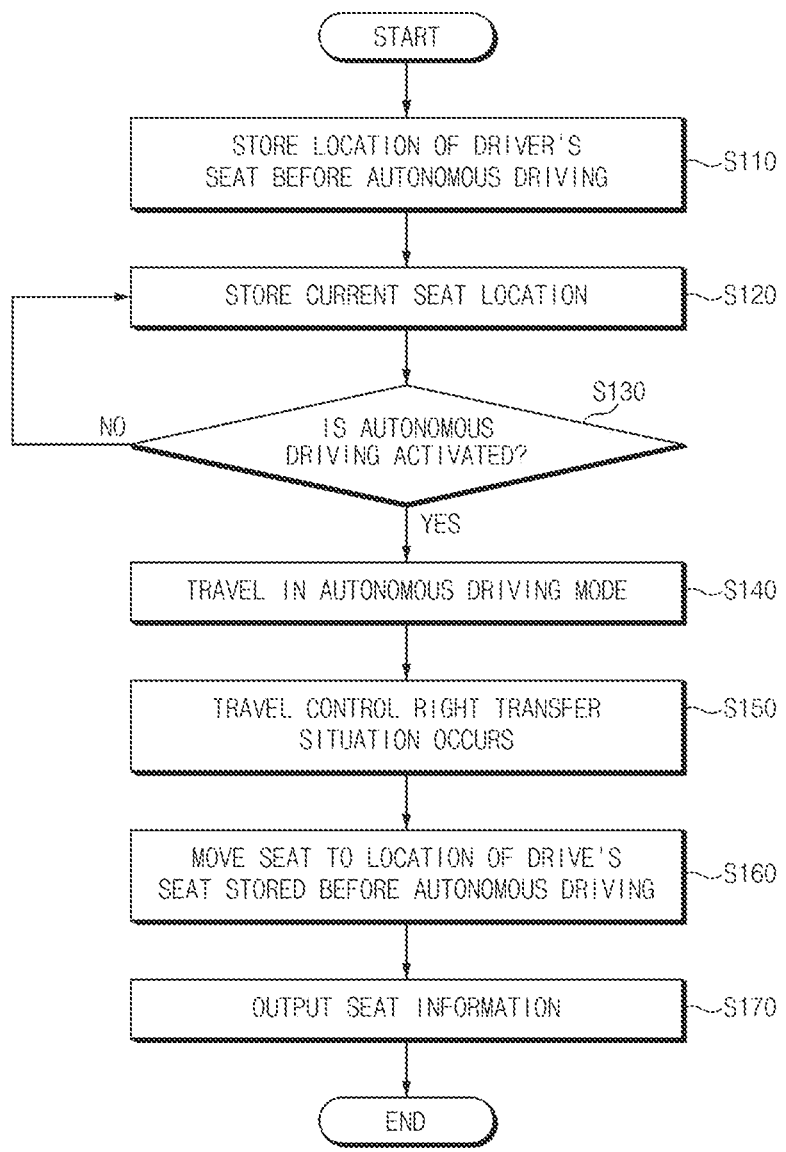
FIGS. 2 to 12 are flowcharts illustrating a travel control method of a vehicle according to some forms of the present disclosure.

As shown in FIG. 2, the controller 150 may store the location of the driver's seat before the autonomous driving (S110). In addition, the controller 150 may store the current seat location (S120). According to one form, the controller 150 may determine whether the autonomous driving is activated (S130). When it is determined in S130 that the autonomous driving is activated, the controller 150 may control the travel in an autonomous driving mode (S140).

When the travel control right (i.e., a driving control right which enables the driver or a system to control the vehicle) is transferred to the driver (S150), the controller 150 may set the seat location to the location of the driver's seat before the autonomous driving is activated, and move the seat to the set seat location (S160). That is, the controller 150 may control to enable immediate manual travel when the travel control right is transferred to the driver by setting the seat location to the location of the driver's seat before the autonomous driving is activated and moving the seat to the set seat location. In addition, the controller 150 may control to output seat information set in S160 through the output device 140 (S170).

Figure 3:
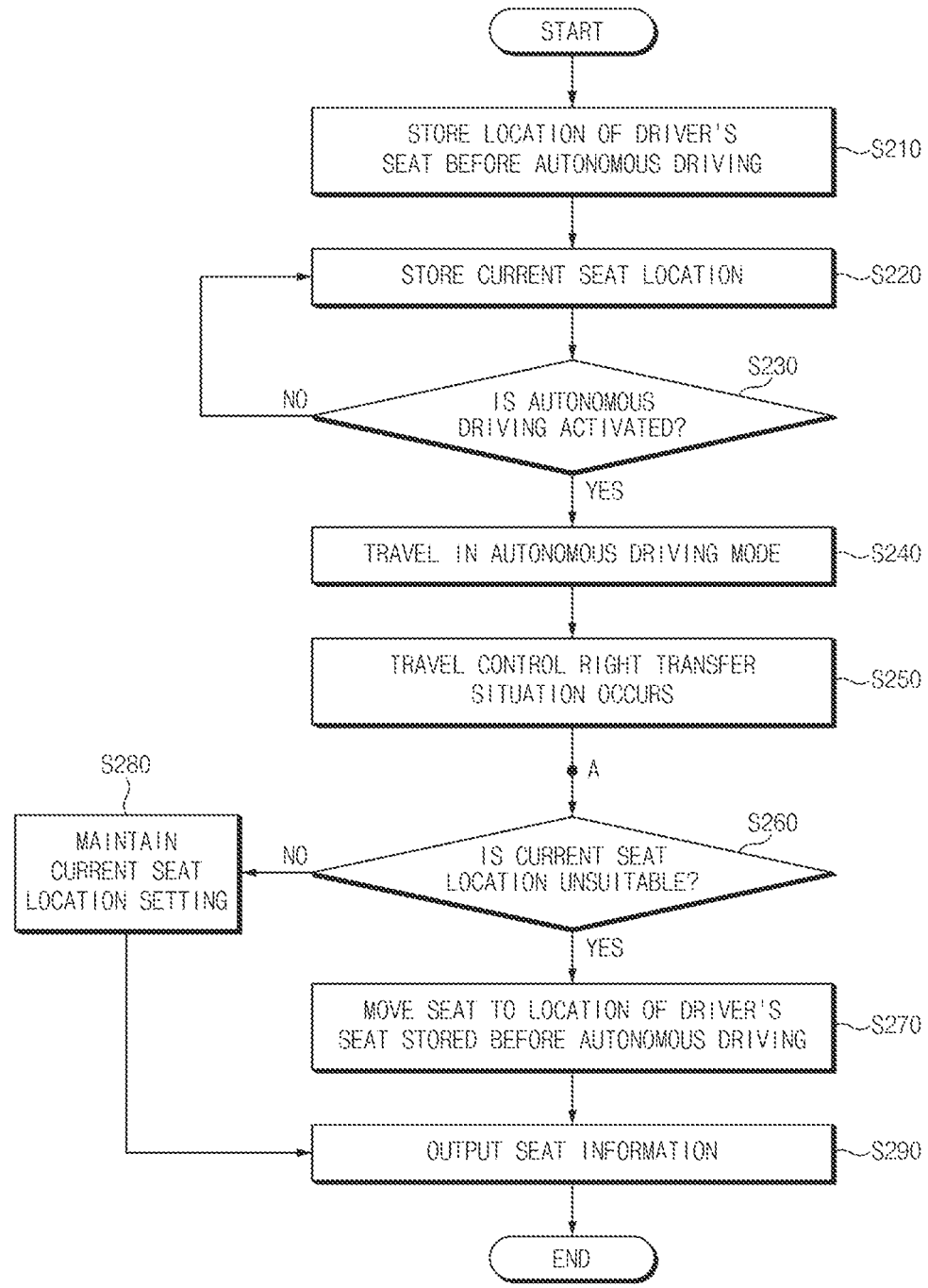

According to another form, as shown in FIG. 3, the controller 150 may store the location of the driver's seat before the autonomous driving (S210). In addition, the controller 150 may store the current seat location (S220). The controller 150 may determine whether the autonomous driving is activated (S230). When it is determined in S230 that the autonomous driving is activated, the controller 150 may control the travel in the autonomous driving mode (S240).

When the travel control right is transferred to the driver (S250), the controller 150 may determine whether the current seat location is unsuitable (S260). For a more detailed description of the operation for determining whether the current seat location is unsuitable in S260, FIGS. 4 and 5 will be referred.

When it is determined in S260 that the current seat location is unsuitable (Y), the controller 150 may set the seat location to the location of the driver's seat before the autonomous driving is activated, and control to move the seat to the set seat location (S270). On the other hand, when it is determined in S260 that the current seat location is suitable (N), the controller 150 may control to maintain the current seat location (S280).

In addition, the controller 150 may control to output the seat information set in S270 and S280 through the output device 140 (S290).

Figure 4:
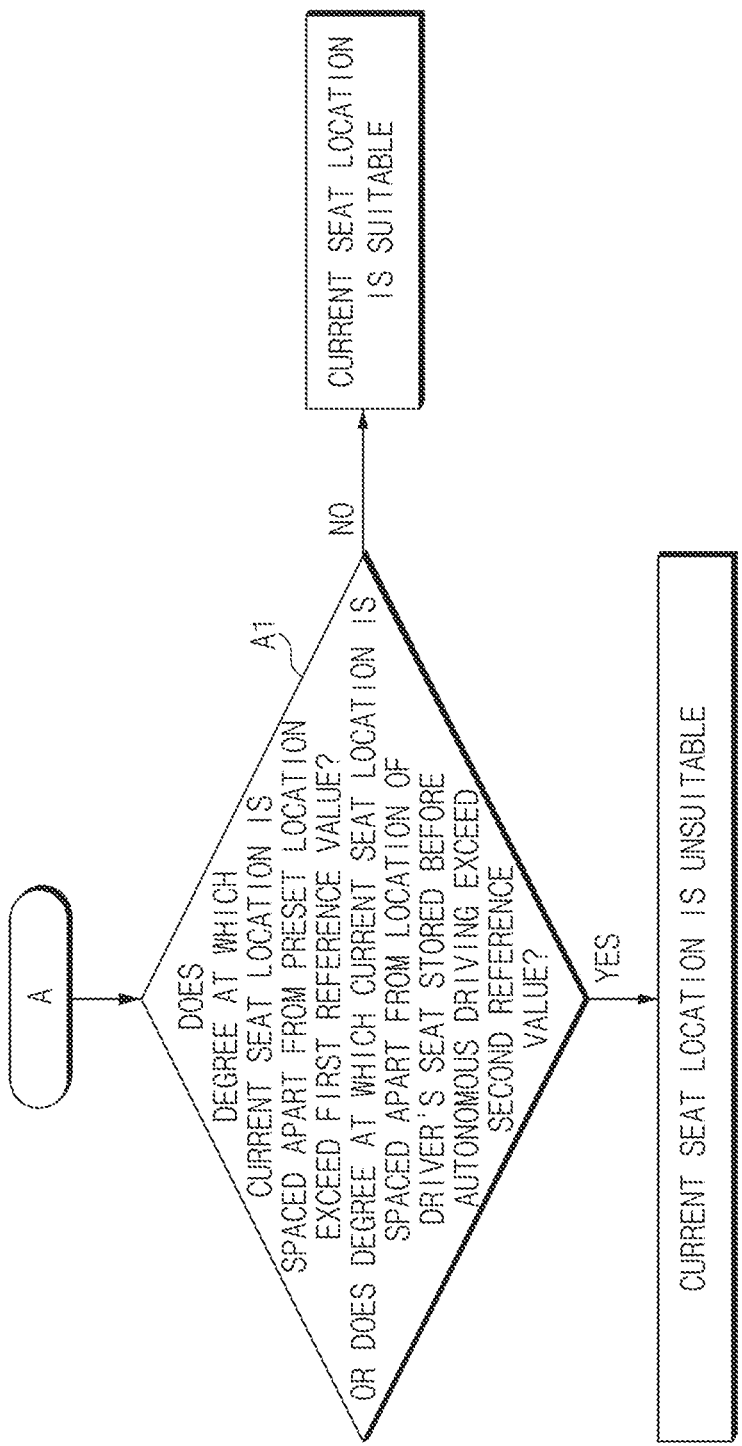

As shown in FIG. 4, the controller 150 may determine whether a condition of A1 is satisfied to determine whether the current seat location is unsuitable. The controller 150 may determine whether the first condition in which the degree at which the current seat location is spaced apart from the preset location exceeds the first reference value or the second condition in which the degree at which the current seat location is spaced apart from the location of the driver's seat before the autonomous driving is activated exceeds the second reference value is satisfied. When the first condition or the second condition is satisfied, the controller 150 may determine that the current seat location is unsuitable for the manual travel. When the first condition and the second condition are not satisfied, the controller 150 may determine that the current seat location is suitable for the manual travel.

Figure 5:
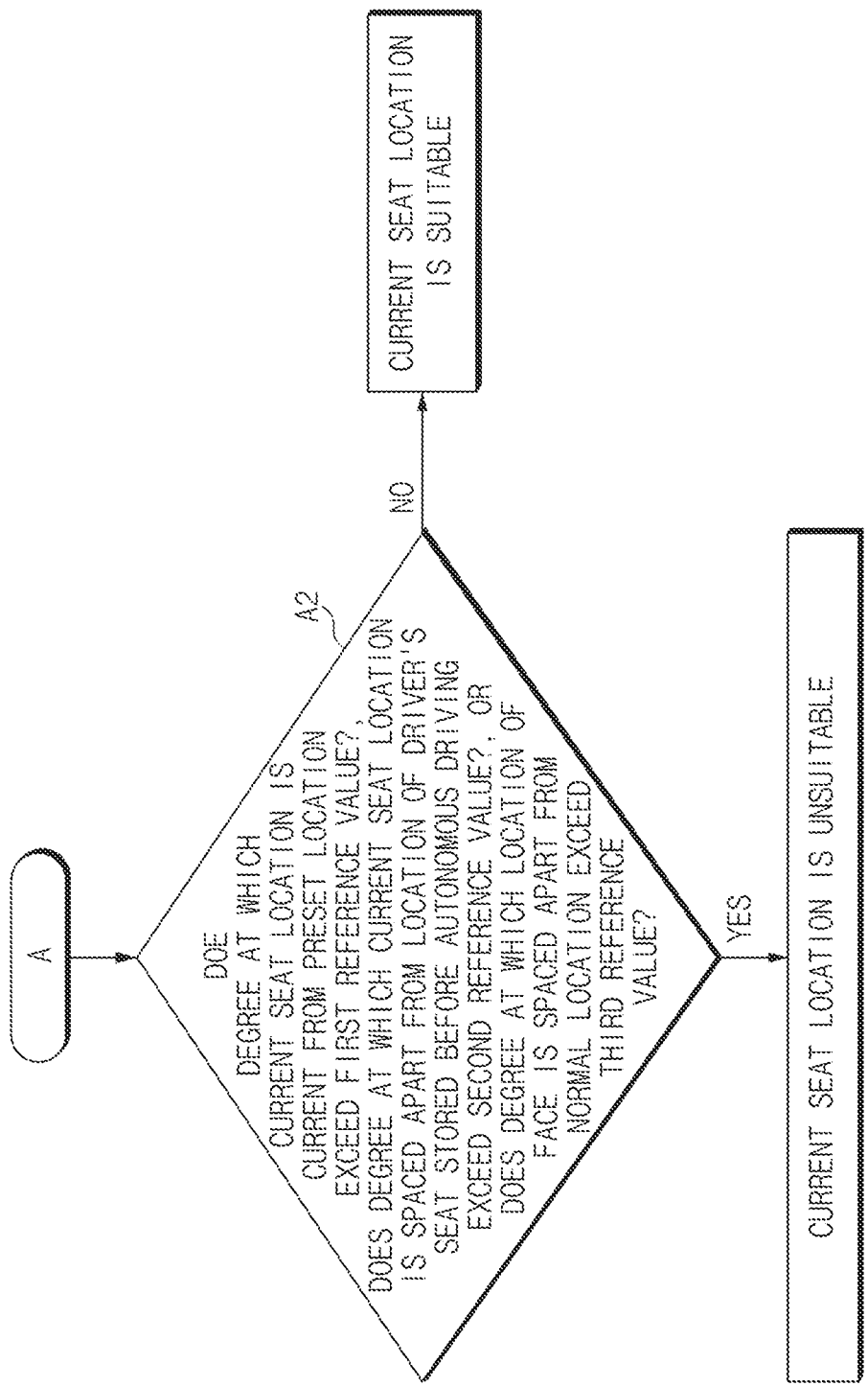

As shown in FIG. 5, the controller 150 may determine whether a condition of A2 is satisfied to determine whether the current seat location is unsuitable. The controller 150 may determine whether any one of the first condition in which the degree at which the current seat location is spaced apart from the preset location exceeds the first reference value, the second condition in which the degree at which the current seat location is spaced apart from the location of the driver's seat before the autonomous driving is activated exceeds the second reference value, and the third condition in which the degree at which the location of the face of the driver is spaced apart from the normal location exceeds the third reference value is satisfied. When one of the first condition, the second condition, and the third condition is satisfied, the controller 150 may determine that the current seat location is unsuitable for the manual travel. When the first condition, the second condition, and the third condition are satisfied, the controller 150 may determine that the current seat location is suitable for the manual travel.

Figure 6:
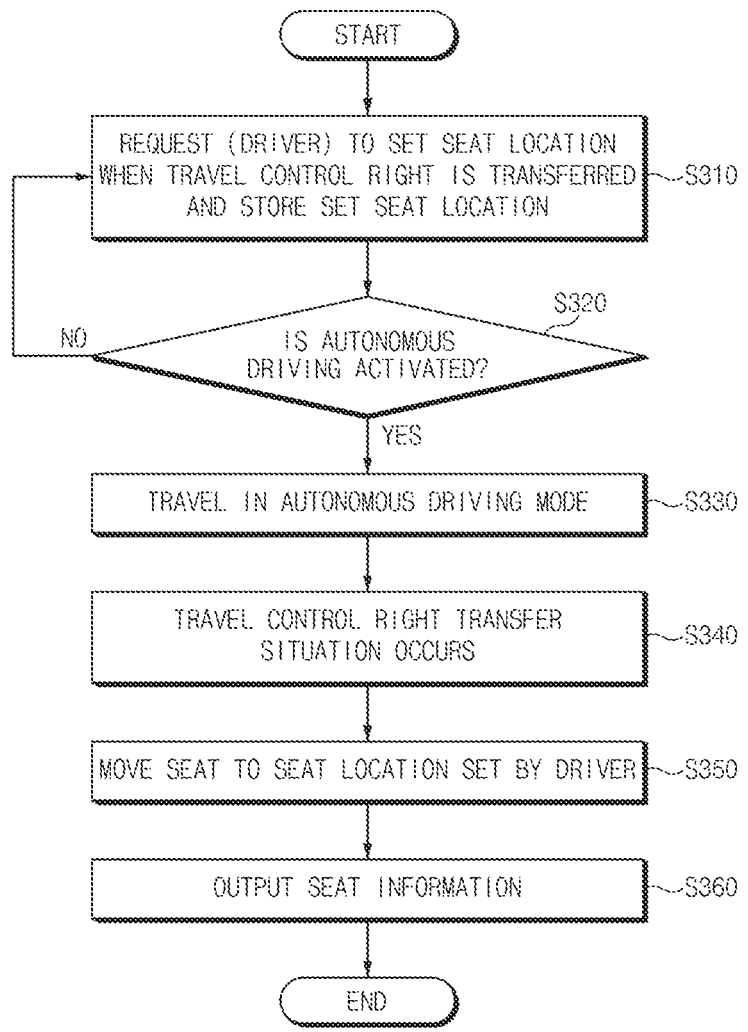

As shown in FIG. 6, the controller 150 may request the driver to set a seat location to be used when the travel control right is transferred to the driver (S310). According to one form, in S310, the controller 150 may provide a user interface such that the driver sets the seat location, and store the seat location when the seat location setting is completed by the driver. In this connection, the controller 150 may control to store the seat location only when the seat location is set within a changeable predetermined range.

The controller 150 may determine whether the autonomous driving is activated (S320). When it is determined in S320 that the autonomous driving is activated, the controller 150 may control the travel in the autonomous driving mode (S330).

When the travel control right is transferred to the driver (S340), the controller 150 may set the seat location to the seat location set by the driver in S310, and move the seat to the set seat location (S350). That is, the controller 150 may control to enable the manual travel immediately when the travel control right is transferred to the driver by setting the seat location to the seat location set by the driver and moving the seat to the set seat location. In addition, the controller 150 may control to output the seat information set in S350 through the output device 140 (S360).

Figure 7:
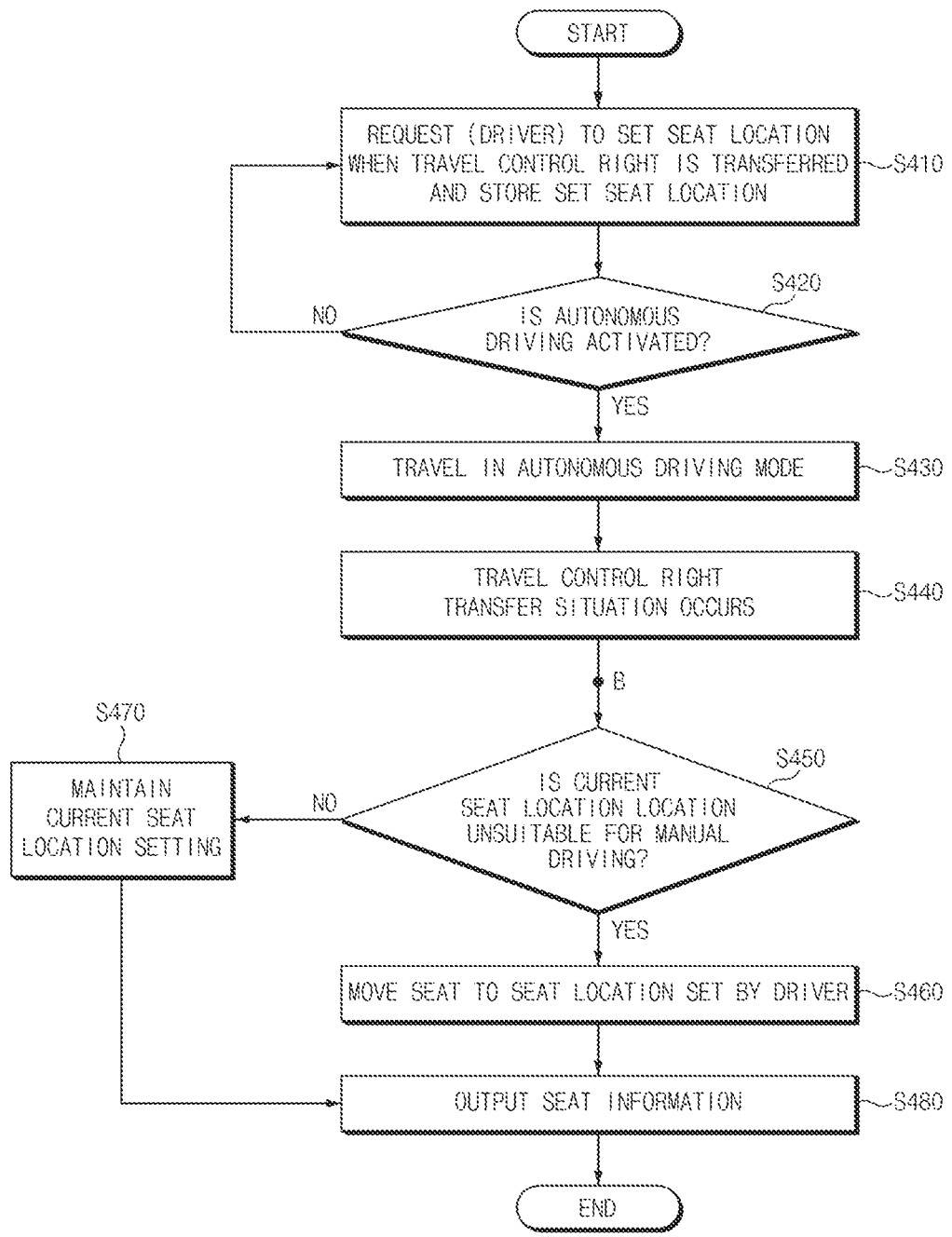

As shown in FIG. 7, the controller 150 may request the driver to set the seat location to be used when the travel control right is transferred to the driver (S410). According to another form, in S410, the controller 150 may provide the user interface such that the driver sets the seat location, and may store the seat location when the seat location setting is completed by the driver. In this connection, the controller 150 may control to store the seat location only when the seat location is set within the changeable predetermined range.

The controller 150 may determine whether the autonomous driving is activated (S420). When it is determined in S420 that the autonomous driving is activated, the controller 150 may control the travel in the autonomous driving mode (S430).

When the travel control right is transferred to the driver (S440), the controller 150 may determine whether the current seat location is the location unsuitable for the manual driving (S450). For a more detailed description of the operation for determining whether the current seat location is unsuitable in S450, FIG. 8 will be referred.

When it is determined in S450 that the current seat location is unsuitable (Y), the controller 150 may set the seat location to the location of the driver's seat before the autonomous driving is activated, and control the seat to move to the set seat location (S460). On the other hand, when it is determined in S450 that the current seat location is suitable (N), the controller 150 may control to maintain the current seat location (S470).

In addition, the controller 150 may control to output the seat information set in S460 and S470 through the output device 140 (S480).

Figure 8:
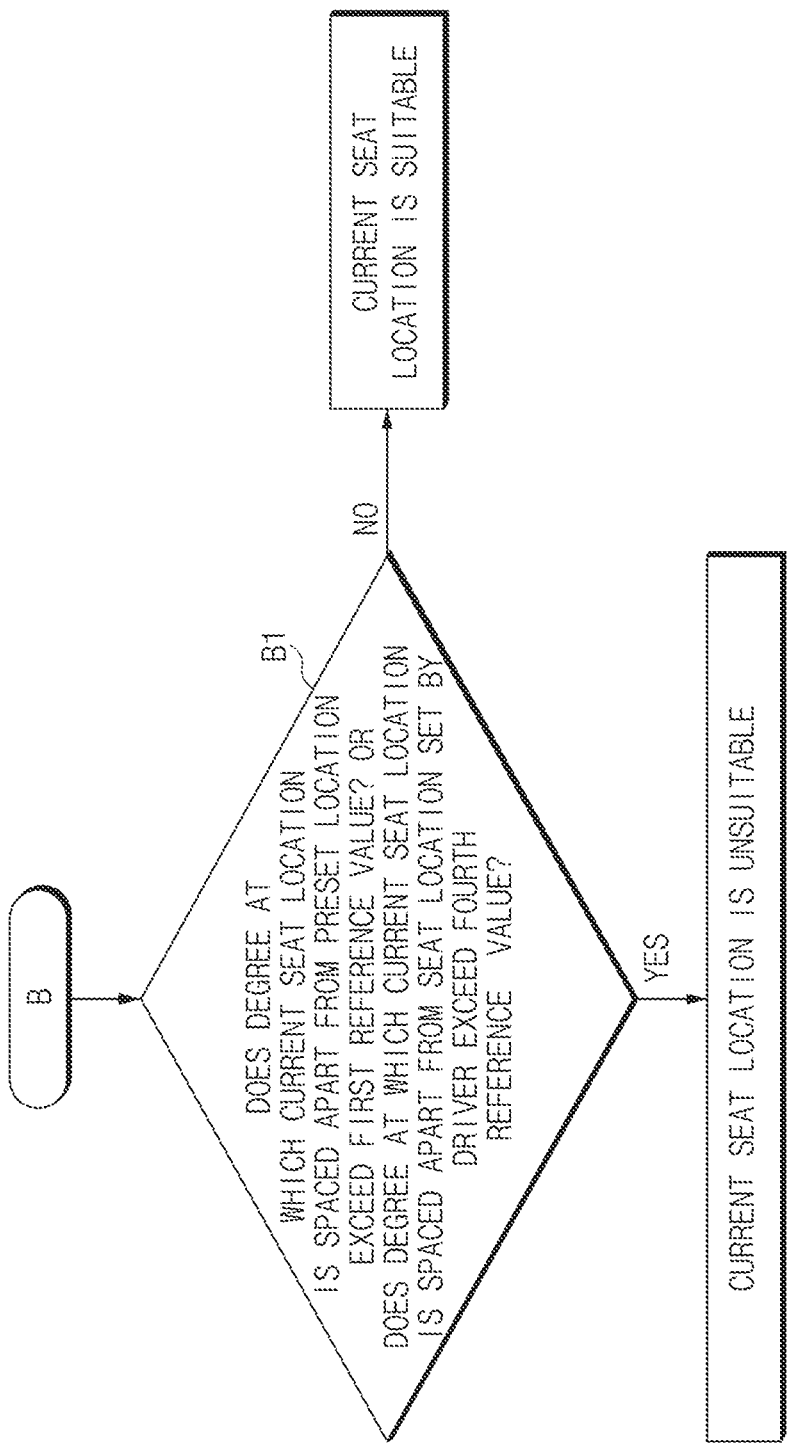

As shown in FIG. 8, the controller 150 may determine whether a condition of BI is satisfied to determine whether the current seat location is unsuitable. The controller 150 may determine whether the first condition in which the degree at which the current seat location is spaced apart from the preset location exceeds the first reference value or the fourth condition in which the current seat location is spaced apart from the seat location set by the driver exceeds the fourth reference value is satisfied. When the first condition or the fourth condition is satisfied, the controller 150 may determine that the current seat location is unsuitable for the manual travel. When the first condition and the fourth condition are not satisfied, the controller 150 may determine that the current seat location is suitable for the manual travel.

Figure 9:
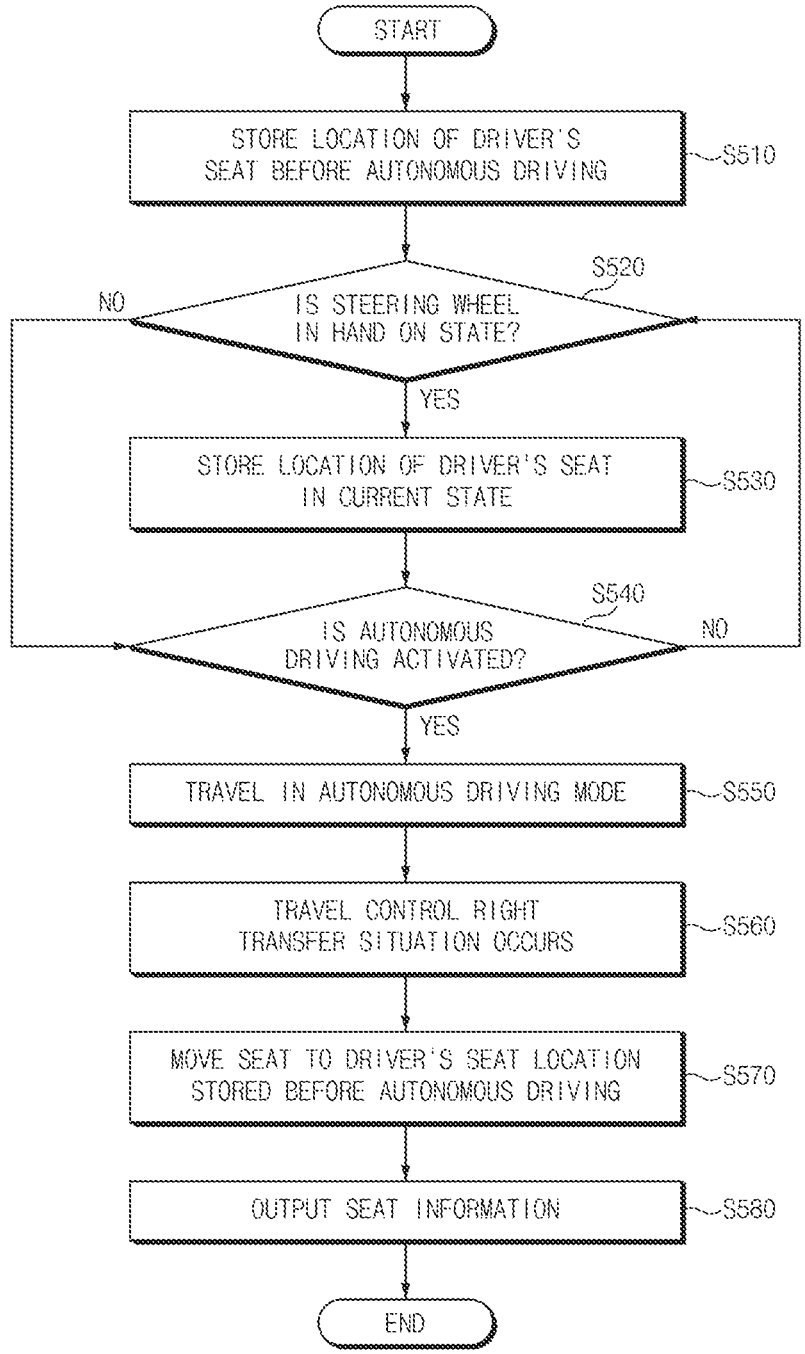

As shown in FIG. 9, the controller 150 may store the location of the driver's seat before the autonomous driving (S510). The controller 150 may determine whether the steering wheel is in the hand on state (S520). When it is determined that the steering wheel is in the hand on state, the controller 150 may store a location of the driver's seat in the current state (S530).

When the location of the driver's seat in the current state is stored, or the steering wheel is not in the hand on state, the controller 150 may determine whether the autonomous driving is activated (S540). When it is determined that the autonomous driving is activated, the controller 150 may control the travel in the autonomous driving mode (S550).

When the travel control right is transferred to the driver (S560), the controller 150 may set the seat location to the location of the driver's seat before the autonomous driving is activated, and move the seat to the set seat location (S570). In addition, the controller 150 may control to output the seat information set in S550 through the output device 140 (S580).

Figure 10:
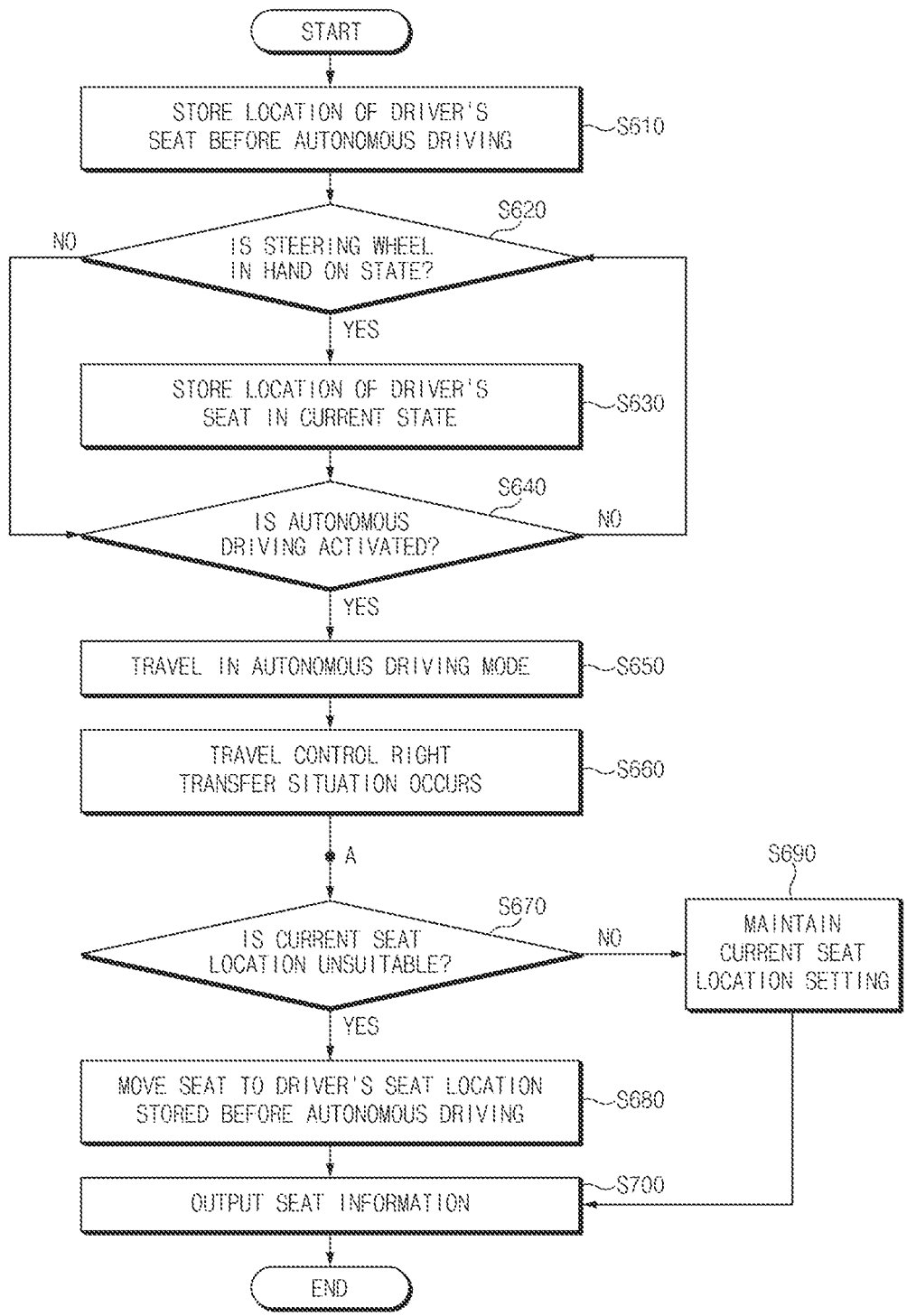

As shown in FIG. 10, the controller 150 may store the location of the driver's seat before the autonomous driving (S610). The controller 150 may determine whether the steering wheel is in the hand on state (S620). When it is determined that the steering wheel is in the hand on state, the controller 150 may store the location of the driver's seat in the current state (S630).

When the location of the driver's seat in the current state is stored or the steering wheel is not in the hand on state, the controller 150 may determine whether the autonomous driving is activated (S640). When it is determined that the autonomous driving is activated, the controller 150 may control the travel in the autonomous driving mode (S650).

When the travel control right is transferred to the driver (S660), the controller 150 may determine whether the current seat location is unsuitable (S670). For a more detailed description of the operation for determining whether the current seat location is unsuitable in S670, refer to FIG. 4.

When it is determined in S670 that the current seat location is unsuitable (Y), the controller 150 may set the seat location to the location of the driver's seat (a seat location at which last manual travel was performed in the state of gripping the steering wheel) before the autonomous driving is activated, and control the seat to move to the set seat location (S680). On the other hand, when it is determined in S670 that the current seat location is suitable (N), the controller 150 may control to maintain the current seat location (S690).

In addition, the controller 150 may control to output the seat information set in S680 and S690 through the output device 140 (S700).

Figure 11:
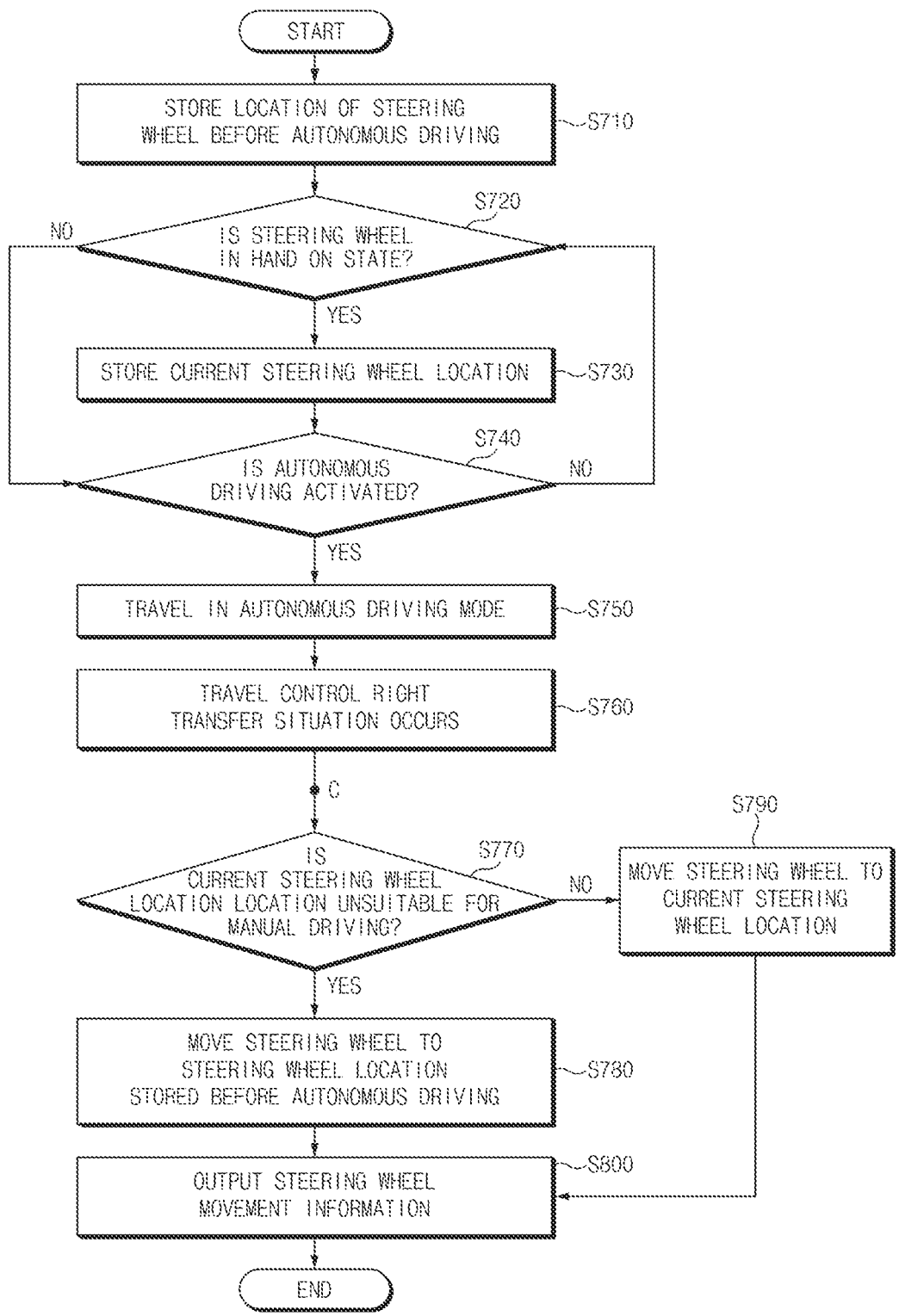

As shown in FIG. 11, the controller 150 may store the steering wheel location before the autonomous driving (S710). The controller 150 may determine whether the steering wheel is in the hand on state (S720). When it is determined in S720 that the steering wheel is in the hand on state, the controller 150 may store the steering wheel location in the current state (S730).

When the steering wheel location in the current state is stored or the steering wheel is not in the hand on state, the controller 150 may determine whether the autonomous driving is activated (S740). When it is determined that the autonomous driving is activated, the controller 150 may control the travel in the autonomous driving mode (S750).

When the travel control right is transferred to the driver (S760), the controller 150 may determine whether the current steering wheel location is unsuitable (S770). For a more detailed description of the operation for determining whether the current steering wheel location is unsuitable in S770, FIG. 12 will be referred.

When it is determined in S770 that the current steering wheel location is unsuitable (Y), the controller 150 may set the steering wheel location to the steering wheel location before the autonomous driving is activated, and control the steering wheel to move to the set steering wheel location (S780). In one example, when it is determined in S770 that the current steering wheel location is suitable (N), the controller 150 may control to maintain the current steering wheel location (S790).

In addition, the controller 150 may control to output the seat information set in S780 and S790 through the output device 140 (S800).

Figure 12:
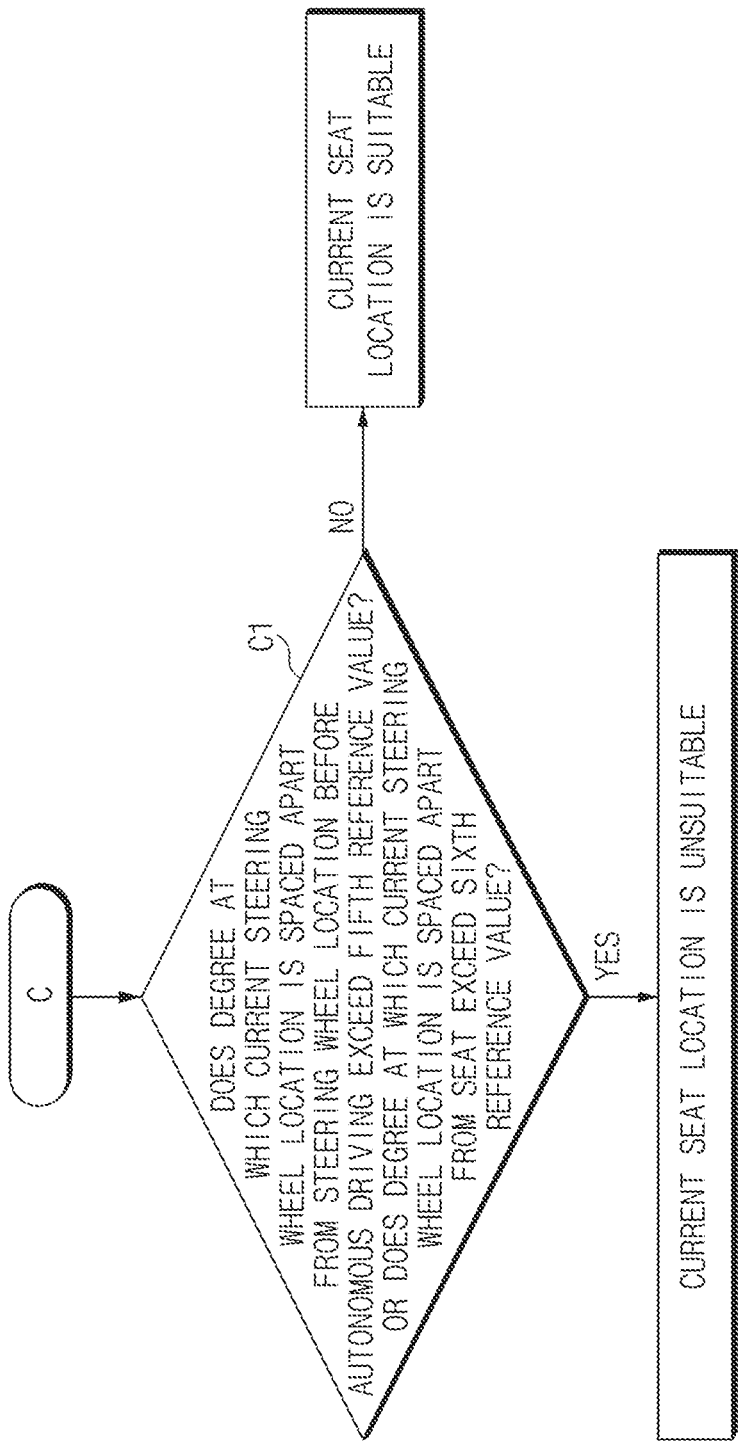

As shown in FIG. 12, the controller 150 may determine whether a condition of C1 is satisfied to determine whether the current seat location is unsuitable. The controller 150 may determine whether the fifth condition in which the degree at which the current steering wheel location is spaced apart from the steering wheel location before the autonomous driving exceeds the fifth reference value or the sixth condition in which the degree at which the current steering wheel location is spaced apart from the seat exceeds the sixth reference value is satisfied. When the fifth condition or the sixth condition is satisfied, the controller 150 may determine that the current steering wheel location is unsuitable for the manual travel. When the fifth condition and the sixth condition are not satisfied, the controller 150 may determine that the current steering wheel location is suitable for the manual travel.

Figure 13:
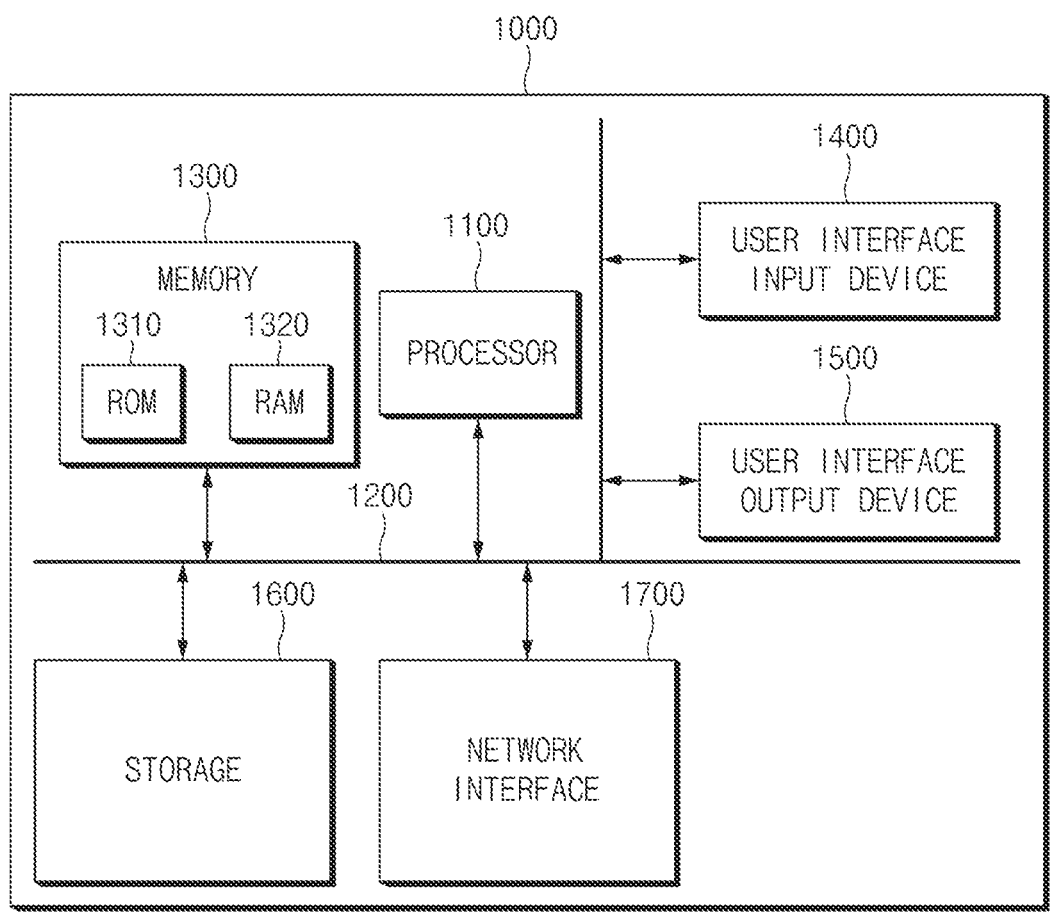
FIG. 13 is a diagram illustrating a configuration of a computing system executing a method according to an exemplary form of the present disclosure.

FIG. 13 illustrates a computing system in which a method according to another form of the present disclosure is implemented.

With reference to FIG. 13, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the forms disclosed in the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

The device and the method for controlling the travel of the vehicle according to an exemplary form of the present disclosure may allow the driver to immediately receive the travel control right when the travel control right is transferred from the system to the driver, so that the transfer of the travel control right may be performed safely.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device for controlling travel of a vehicle, the device comprising:
    a storage medium configured to store at least one of a first seat location before an autonomous driving, a second seat location set by a driver, or a third seat location in a current state, wherein the third seat location is stored when a steering wheel is in hand on state; and
    a controller configured to control a seat of the vehicle based on a seat location stored in the storage medium when a driving state of the vehicle is switched from an autonomous driving state to a manual driving state by transferring a control right of the vehicle to the driver,
    wherein the controller is configured to
        request the driver to set the second seat location to be used when the travel control right is transferred to the driver, and
        output that the seat location is set to the second seat location by the driver when i) the seat location is set to the second seat location by the driver and ii) the control right transfers from the vehicle to the driver.

2. The device of claim 1, wherein the controller is configured to set the seat location to the first seat location when the first seat location is stored in the storage medium, and the control right is transferred to the driver.

3. The device of claim 1, wherein the controller is configured to set the seat location to the second seat location when the second seat location is stored in the storage medium, and the control right is transferred to the driver.

4. The device of claim 1, wherein the controller is configured to:
    determine whether the third seat location is unsuitable for a manual driving when the control right is transferred to the driver; and
    set the seat location based on a determination result.

5. The device of claim 4, wherein the controller is configured to determine that the third seat location is unsuitable for the manual driving when one of a first condition where a degree of spacing of the third seat location from a preset seat location exceeds a first reference value, a second condition where a degree of spacing of the third seat location from the first seat location exceeds a second reference value, a third condition where a degree of spacing of a location of a face of the driver from a normal location exceeds a third reference value, and a fourth condition where a degree of spacing of the third seat location from the second seat location exceeds a fourth reference value is satisfied.

6. The device of claim 5, wherein the normal location includes a location where the driver is able to manipulate a brake pedal or an accelerator pedal of the vehicle.

7. The device of claim 4, wherein the controller is configured to set the seat location to the first seat location when the first seat location is stored in the storage medium and it is determined that the third seat location is unsuitable for the manual driving.

8. The device of claim 4, wherein the controller is configured to set the seat location to the second seat location when the second seat location is stored in the storage medium and it is determined that the third seat location is unsuitable for the manual driving.

9. The device of claim 4, wherein the controller is configured to maintain the seat location at the third seat location when it is determined that the third seat location is suitable for the manual driving.

10. The device of claim 1, wherein at least one of a first steering wheel location before the autonomous driving or a second steering wheel location in the current state is further stored in the storage medium.

11. The device of claim 10, wherein the controller is configured to control the steering wheel based on a steering wheel location stored in the storage medium when the control right is transferred to the driver.

12. A method for controlling travel of a vehicle, the method comprising:
    storing, in a storage medium, at least one of a first seat location before an autonomous driving of the vehicle, a second seat location set by a driver, or a third seat location in a current state, wherein the third seat location is stored when a steering wheel is in hand on state;
    requesting, by a controller, the driver to set the second seat location to be used when the travel control right is transferred to the driver;
    switching, by the controller, from the autonomous driving to a manual driving of the vehicle by transferring a control right of the vehicle to the driver;
    controlling, by the controller, a seat of the vehicle based on a seat location stored in the storage medium in a manual driving state of the vehicle; and
    outputting, by the controller, that the seat location is set to the second seat location by the driver when i) the seat location is set to the second seat location by the driver and ii) the control right transfers from the vehicle to the driver.

13. The method of claim 12, further comprising:
    setting, by the controller, the seat location to the first seat location when the first seat location is stored in the storage medium, and the control right is transferred to the driver.

14. The method of claim 12, further comprising:
    setting, by the controller, the seat location to the second seat location when the second seat location is stored in the storage medium, and the control right is transferred to the driver.

15. The method of claim 12, further comprising:
    determining, by the controller, whether the third seat location is unsuitable for the manual driving when the control right is transferred to the driver; and
    setting, by the controller, the seat location based on a determination result.

16. The method of claim 15, further comprising:
    determining, by the controller, that the third seat location is unsuitable for the manual driving when one of a first condition where a degree of spacing of the third seat location from a preset seat location exceeds a first reference value, a second condition where a degree of spacing of the third seat location from the first seat location exceeds a second reference value, a third condition where a degree of spacing of a location of a face of the driver from a normal location exceeds a third reference value, and a fourth condition where a degree of spacing of the third seat location from the second seat location exceeds a fourth reference value is satisfied.

17. The method of claim 16, wherein the normal location includes a location where the driver is able to manipulate a brake pedal or an accelerator pedal.

18. The method of claim 12, further comprising:
    storing, in the storage medium, at least one of a first steering wheel location before the autonomous driving or a second steering wheel location in the current state.

19. The method of claim 18, further comprising:
    controlling, by the controller, the steering wheel based on a steering wheel location stored in the storage medium when the control right is transferred to the driver.

\* \* \* \* \*